United States Patent [19]
Underwood

[11] Patent Number: 4,910,946
[45] Date of Patent: Mar. 27, 1990

[54] EXTENSIBLE COMBINE HEADER

[75] Inventor: Mark R. Underwood, Burr Oak, Kans.

[73] Assignee: Probe Adventures, Inc., Haslet, Tex.

[21] Appl. No.: 208,772

[22] Filed: Jun. 20, 1988

[51] Int. Cl.⁴ .............. A01D 57/04; A01D 34/28; A01D 47/00

[52] U.S. Cl. ............................. 56/14.4; 56/221; 56/257

[58] Field of Search ............. 56/228, 220, 221, 158, 56/208, 227, 288, 257, 260–263

[56] References Cited

U.S. PATENT DOCUMENTS

| | | | |
|---|---|---|---|
| 2,867,962 | 1/1959 | Meyer | 56/158 |
| 3,555,796 | 1/1971 | Baumeister | 56/221 |
| 3,561,198 | 2/1971 | Herbsthofer | 56/20 |
| 4,038,810 | 8/1977 | Williams et al. | 56/220 |
| 4,487,004 | 12/1984 | Kejr | 56/14.4 |

FOREIGN PATENT DOCUMENTS 1033051 8/1983 U.S.S.R. ................. 56/227

*Primary Examiner*—Bruce M. Kisliuk
*Attorney, Agent, or Firm*—James E. Bradley

[57] ABSTRACT

A header for a combine moves between retracted and extended positions. The header has a platform with at least two platform sections. The platforms will extend in longitudinal directions relative to each other. A rotatably driven auger is mounted to the platform and has at least two auger sections. The auger sections telescope. The helical flight on one of the sections collapses when the auger sections retract. A sickle has at least two sickle sections. A sickle extender moves the sickle sections in longitudinal directions relative to each other. A drive mechanism reciprocates the sickle sections relative to the platform for cutting vegetation.

19 Claims, 5 Drawing Sheets

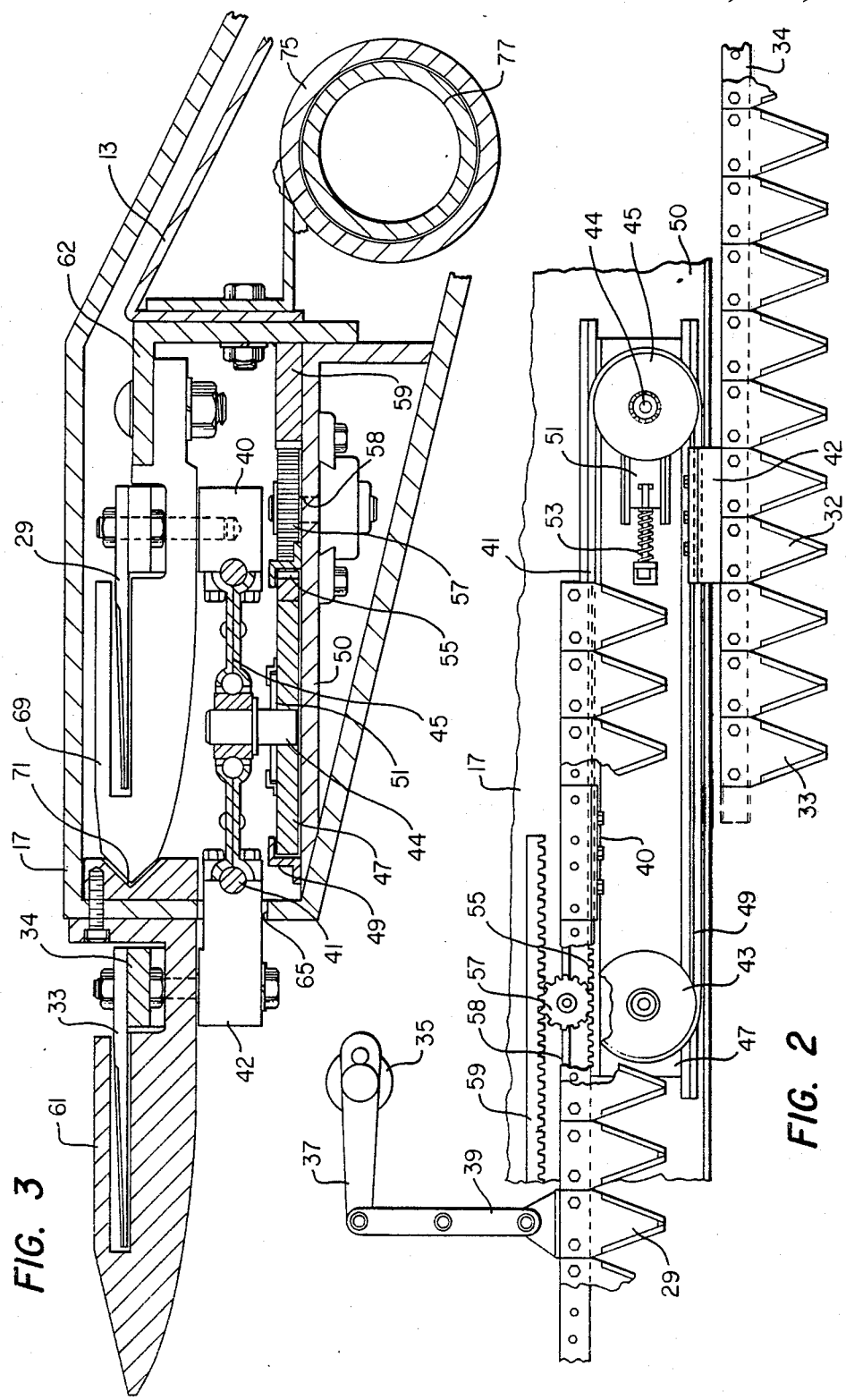

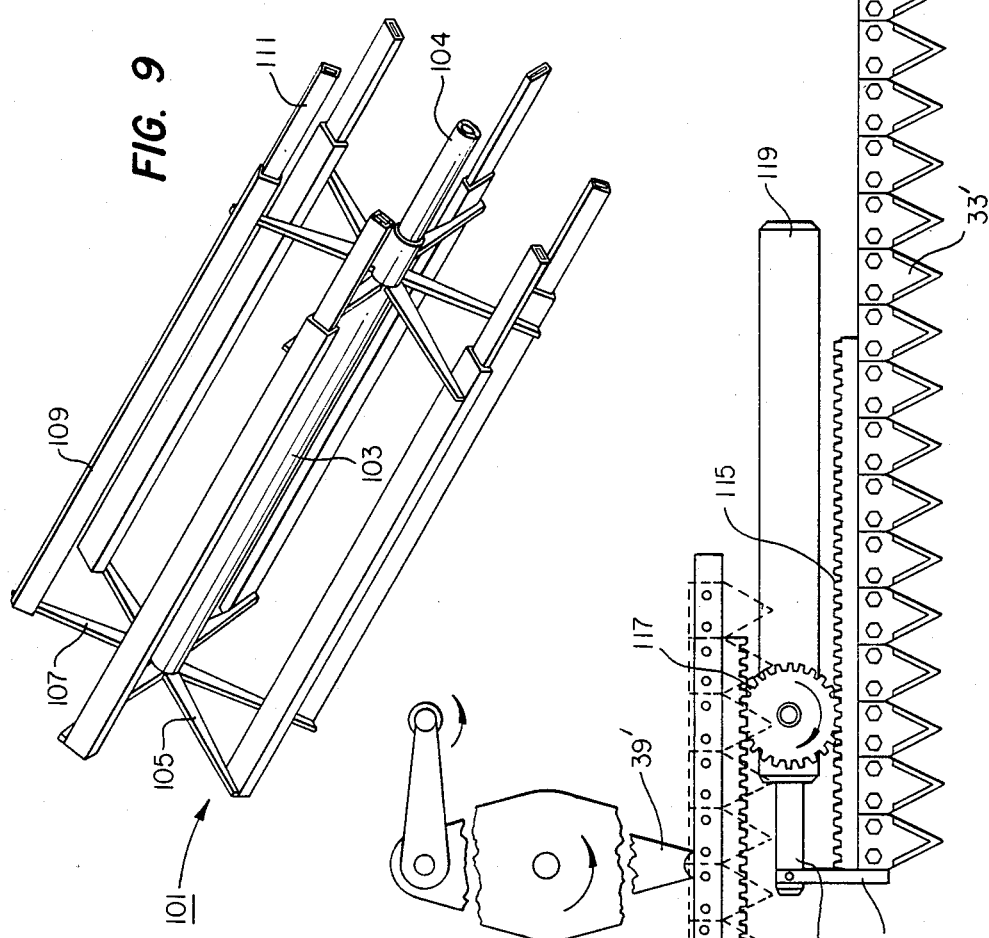

EXTENSIBLE COMBINE HEADER

BACKGROUND OF THE INVENTION

1. Field of the Invention

This invention relates in general to combines for harvesting grain, and in particular to a header for a combine that extends and retracts.

2. Description of the Prior Art

A grain combine is a large implement that will continuously cut and thresh grain. The combine has a header on the front that performs the cutting of the grain. The header has a platform. An auger extends across the platform. A sickle is mounted on the forward edge of the platform. A reel is mounted in front of the sickle.

The sickle is reciprocated side-to-side past stationary fingers. This action cuts the grain. The reel pushes the severed grain inward into the auger. The auger delivers the grain to a central feed opening, where it passes into the threshing portion of the combine.

The headers typically have a width from about sixteen feet to thirty feet. The wider headers allow grain to be cut at a very high rate. However, roads, gates and bridges are often too narrow for transporting a combine from one field to another when it has a wide header. Also, while cutting, many fields have uneven areas, such as terraces, that a very wide header will not cut properly.

The headers can be removed from the combine and transported in a truck or a trailer. This is time consuming. Also, it does not solve the problem of cutting grain with a wide header in uneven fields. A few headers have been built that have side sections that will tilt up for transporting over narrow roads. Also, in U.S. Pat. No. 3,561,198, a proposed header is shown that will move to a retracted position for transport over narrow roads.

SUMMARY OF THE INVENTION

The header of this invention is extensible and will harvest grain in any position between the retracted and extended position. The header has a platform with two extensible sections. These sections will slide inward and outward. The auger is extensible, also sliding inward and outward. The flights on the extensible sections of the auger collapse when moving to the retracted position.

The sickle has a main sickle section and two auxiliary sickle sections that are located forward and parallel with the main sickle section. A drive mechanism reciprocates the main sickle section. A linkage means connected between the main sickle and auxiliary sickle sections reciprocates the auxiliary sickle sections for cutting vegetation. An extension means will move the auxiliary sickle sections from a retracted to an extended position.

BRIEF DESCRIPTION OF THE DRAWINGS

FIG. 2 is a top view, partially sectioned, illustrating a portion of the sickle for the header of FIG. 1.

FIG. 3 is a sectional view of a portion of the header of FIG. 1, taken along the line III-III.

FIG. 9 is a perspective view of a portion of a reel for the header of FIG. 1.

FIG. 10 is a top view of an alternate embodiment for the sickle for the header of FIG. 1.

DESCRIPTION OF THE PREFERRED EMBODIMENT

Figure 1:
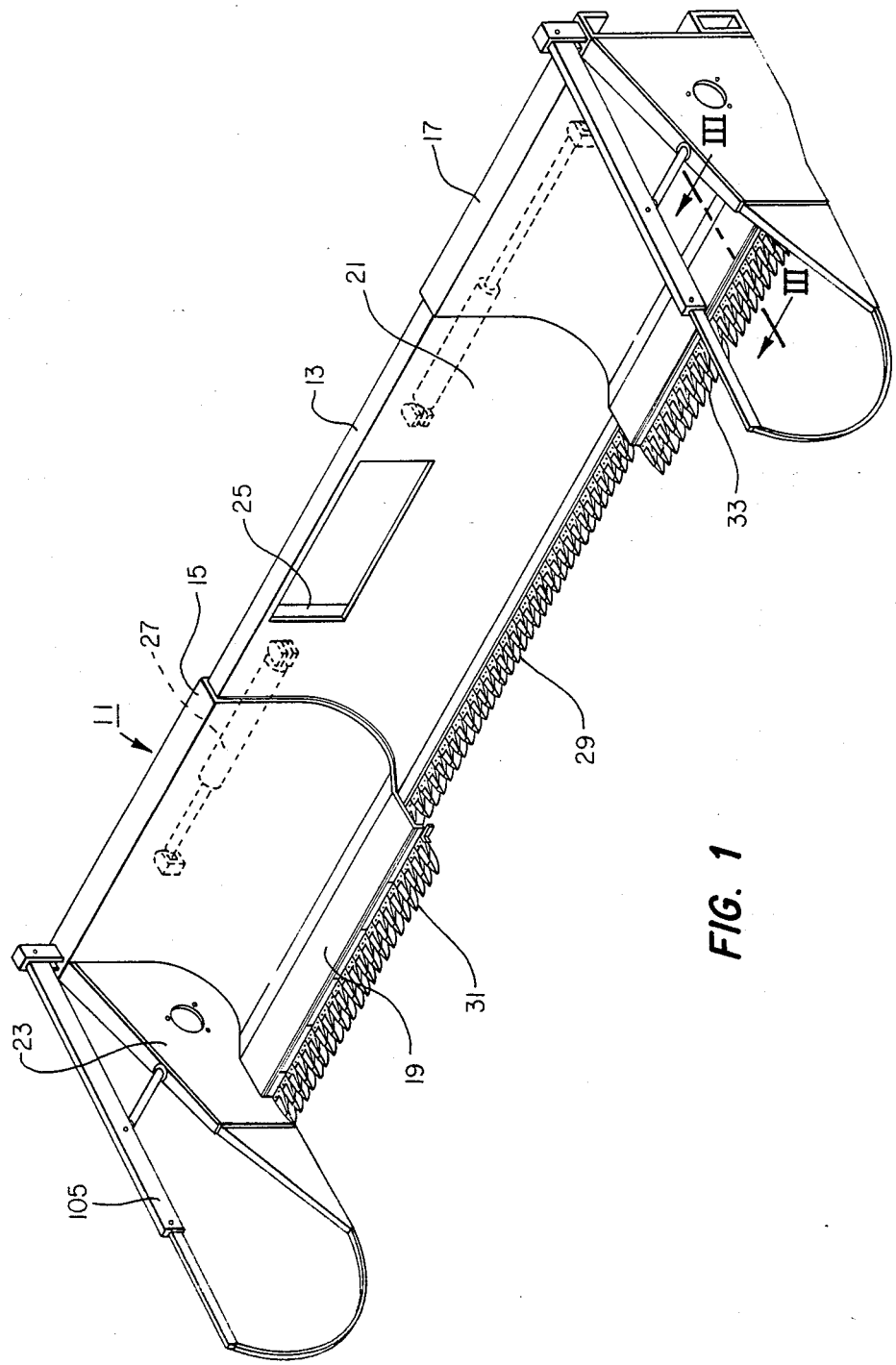
FIG. 1 is a perspective view illustrating a platform for a header constructed in accordance with this invention.

Referring to FIG. 1, header 11 has a main platform 13 that is adapted to be mounted to a combine. An extensible platform 15, 17 extends outward from each side of the main platform 13. Each platform 13, 15, 17 has a curved bottom 19 and a vertical back wall 21. End plates 23 are located on the outer ends of the extensible platforms 15, 17. A feed through opening 25 is located in the center of the main platform 13. The harvested grain will feed through the feed opening 25 into the combine.

The extensible platforms 15, 17 are slidably carried on the main platform 13. Each extensible platform, 17, 15 will independently move between a retracted position and an extended position. In FIG. 1, the extensible platform 15 is shown in a retracted position, while the extensible platform 17 is shown in an extended position. Hydraulic cylinders 2 are connected between the main platform 13 and the extensible platforms 15, 17 for moving the extensible platforms 15, 17 between the extended and retracted positions.

The main sickle 29 is carried on the forward edge of the main platform 13. An auxiliary sickle 31 is carried on the forward edge of the extensible platform 15. An auxiliary sickle 33 is carried on the forward edge of the extensible platform 17. The auxiliary sickles 31, 33 are located on a common longitudinal axis. The auxiliary sickles 31, 33 are located forward of and parallel to the main sickle 29. When in the retracted position, a portion of the main sickle 29 will be recessed behind one of the auxiliary sickles 31, 33.

Referring to FIG. 2, each of the sickles 29, 31, 33 is made up of a plurality of separate cutting blades 32. The cutting blades 32 are flat, triangular shaped elements, each secured to a bar 34 by fasteners. The blades 32 perform the cutting action by a longitudinal reciprocation. The sickles 29, 31, 33 are reciprocated a few inches from side-to-side. The reciprocations are at rate of about five per second.

The drive means for reciprocating the sickles 29, 31, 33 includes a main drive 35, shown in FIG. 2. The main drive 35 has an eccentric that reciprocates a drive link 37, which in urn reciprocates a drive link 39. The drive link 39 is pivotally connected to the main sickle 29. The main drive 35 converts a rotary motion from a power source in the combine (not shown) into the reciprocating action on the main sickle 29.

Each end of the main sickle 29 is fixed to a linking member or cable 41 by means of a bracket 40. Only one end of the main sickle 29 is shown in FIG. 2. Each cable 41 extends around a pair of guide wheels 43, 45. This results in a rearward run to which the bracket 40 is connected. There is also a forward run to which the auxiliary sickle 31 or 33 will be fastened by a bracket 42.

The guide wheels 43, 45 are mounted on axles 44 and thus are rotatable.

The reciprocating movement of the main sickle 29 causes the cable 41 to move back and forth, rotating the guide wheels 43, 45 back and forth. The bracket 42 causes the auxiliary sickles 31,33 to reciprocate in unison with each other and with the forward run of the cable 41. The auxiliary sickles 31, 33 will be out of phase with the main sickle 29. When the main sickle 29 moves to the right, the auxiliary sickles 31, 33 will move to the left.

The axles 44 of the guide wheels 43, 45 are mounted to a sliding plate 47. Sliding plate 47 is carried on subfloor 50 (FIG. 3) on each extensible platform 15, 17. The extensible platforms 15, 17 and will slide relative to the sliding plates 47. The sliding plates 47 also slide relative to the main platform 13. Guide tracks 49 on each side of the sliding plate 47 cause the sliding plate 47 to slide parallel with the main sickle 29.

A tension plate 51 will slide on each sliding plate 47. Tension plate 51 holds the axle 44 of the guide wheel 45. A spring 53 urges the tension plate 51 away from the guide wheel 43. The spring 53 thus applies tension to the cable 41 that extends around the guide wheels 43, 45.

A rack 55 containing a plurality of teeth is located on the rearward edge f sliding plate 47. The rack 55 is parallel with the main sickle 29. A pinion 57 has teeth that engage the rack 55. The pinion 57 also engages a stationary rack 59. Pinion 57 is mounted in an elongated slot 58 (FIG. 3) in the subfloor 50 of each extensible platform 15, 17. As shown in FIG. 3, rack 59 is stationarily mounted to a bracket 62, which is a rigid part of the main platform 13. Pinion 57 will rotate relative to the main and extensible platforms 13, 15, 17. Also, the axle of the pinion 57 will move relative to the main platform 13 for a distance approximately the length of one run of cable 41. Each extensible platform 15, 17 will also move relative to one of the pinions 57 for a distance equal to the length of one run of cable 41. The bracket 62 shown in FIG. 3 and the rack 59 slide on the subfloor 50 during retraction and extension.

Referring to FIG. 3, a plurality of guards 61 are rigidly mounted to the forward edge of each extensible platform 15, 17. Each guard 61 is a conventional member, having fingers or prongs that are spaced apart from each other. The grain passes between the fingers of each guard 61. The auxiliary sickles 31, 33 reciprocate within a slot in the guards 61 for severing the grain. The bracket 42 extends through a hole 65 in the forward edge of the extensible platforms 15, 17 and into engagement with the cable 41.

Guards 69 of the same type as guards 61 are rigidly mounted to bracket 62 of the main platform 13. Guards 69 have slots that reciprocally receive the main sickle 29. The forward tips of the guards 69 slide in a guide slot 71 located within the extensible platforms 15, 17.

Referring still to FIG. 3, a pair of hydraulic cylinders 75 (only one shown) are mounted rigidly to the main platform 13. The piston 77 of each hydraulic cylinder 75 is connected to one of the extensible platforms 15, 17. The hydraulic cylinders 75 assist the hydraulic cylinders 27 (FIG. 1) in extending and retracting the extensible platforms 15, 17.

Figure 8:
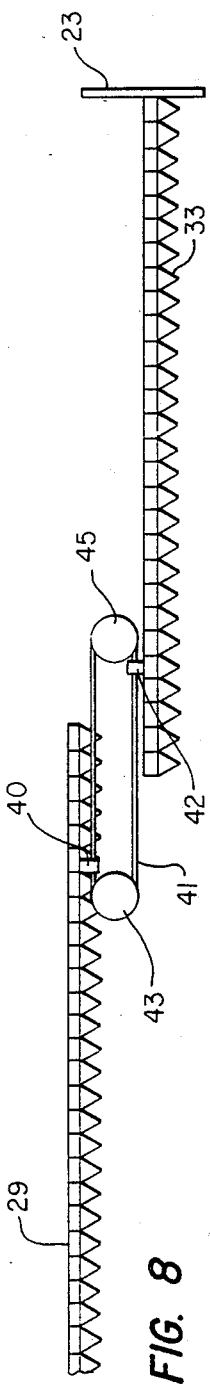
FIG. 8 is a schematic view of the main and auxiliary sickles of FIG. 7, shown in an extended position.

In FIG. 2 and in the schematic representation in FIG. 8, the auxiliary sickle 33 is shown in its fully extended position. When the hydraulic cylinders 27 (FIG. 1) and 75 (FIG. 3) are actuated in a retracting direction, the extensible platforms 15, 17 will begin to retract. The main sickle 29 remains stationary. The pinion 57 rotates and moves longitudinally relative to the main platform 13. This causes the sliding plate 47 to begin sliding to the left, as shown in FIG. 2.

Because the cable 41 is fixed to the main sickle 29, which is not moving, the guide wheels 43, 45 will rotate. The cable 41 will move the auxiliary sickle 33 to the left. The auxiliary sickle 33 will move in unison with the sliding movement of the extensible platform 17.

Figure 7:
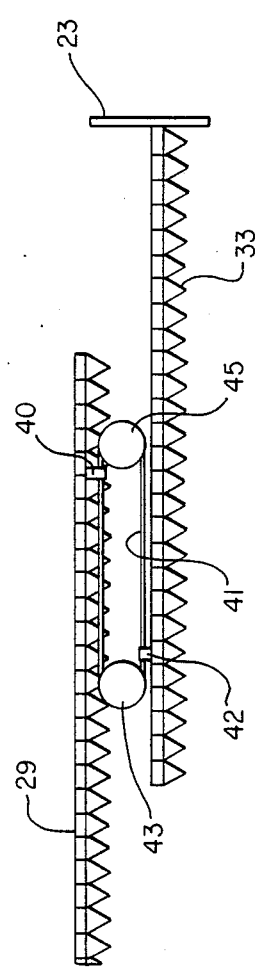
FIG. 7 is a schematic view of a part of the main sickle and an auxiliary sickle, shown in a retracted position.

In the fully retracted position illustrated in FIG. 7, the guide wheel 45 will be located near the bracket 40, which has not moved relative to the main platform 13. The bracket 42 will be located near the guide wheel 43 because of movement of the cable 41. When moving from the extended position to the retracted position, the sliding plate 47 will slide to the left for a distance approximately equal to the distance between inner edges of guide wheels 43, 45. This is the distance of one of the cable 41 runs. The bracket 42 and auxiliary sickle 33 will move a distance approximately twice the length between inner edges of the two guide wheels 43, 45. One-half of the movement is due to the movement of the sliding plate 47 relative to the main platform 13. The other half of the movement is due to the rotation of the cable 41 about the stationary pint at bracket 40. The extensible platforms 15, 17 will extend also twice the distance between the inner edges of the guide wheels 43, 45.

In the retracted position, the auxiliary sickles 31, 33 will overlap the main sickle 29 for a portion equal to approximately twice the length of one of the cable 41 runs. In the extended position, there will be substantially no overlap of the auxiliary sickles 31, 33 with the main sickle 29. If desired, one extensible platform 15, 17 can remain stationary while the other retracts or extends. Although the drive assembly, including the guide wheels 43, 45, are shown only for auxiliary sickle 33, there will be an identical assembly for the auxiliary sickle 31.

Figure 4:
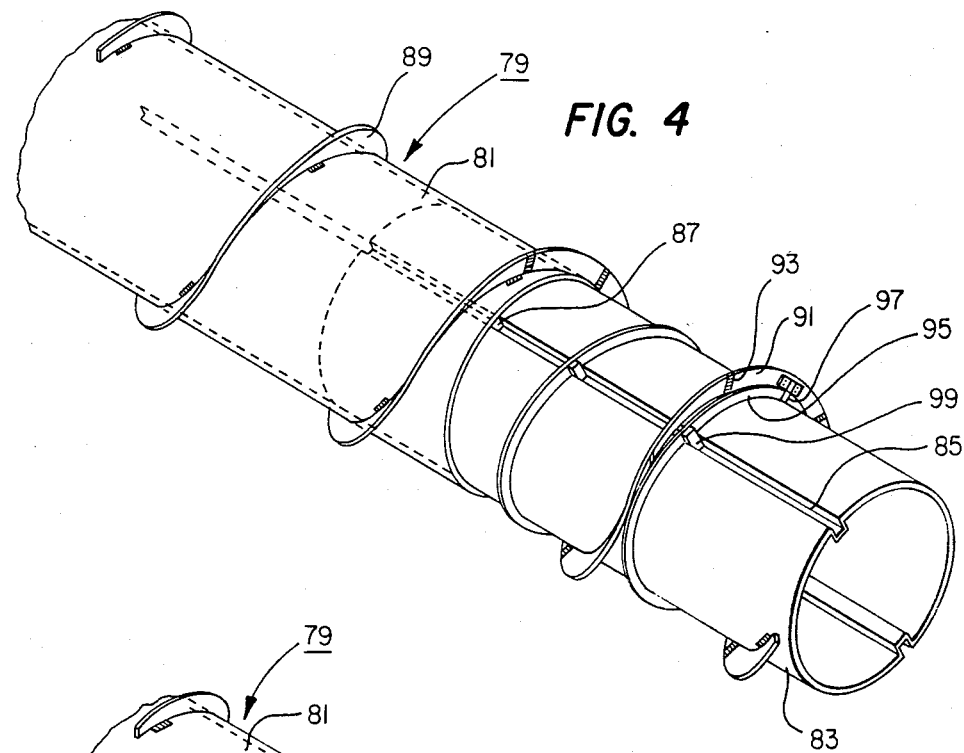
FIG. 4 is a perspective view of a portion of the auger for the header of FIG. 1, shown in the extended position.

Referring to FIG. 4, an auger 79 will be carried between the two end plates 23 of the extensible platforms 15, 17 (FIG. 1). The auger 79 has a main section 81 in the center. An extensible auger section 83 is located on each end (only one shown). The auger 79 is rotated conventionally such as by drive belts (not shown) driven by the combine and located at the end plates 23. Main auger section 81 is a large cylinder. Each extensible auger section 83 is also a cylinder, but is of slightly smaller diameter so that it will telescope within the main auger section 81. A longitudinal guide slot 85 is formed in the side wall of each extensible auger section 83. Guide slot 85 registers with a guide strip 87 located on the inner diameter of the main auger section 81. The slot 85 and strip 87 prevent the auger sections 81, 83 from rotating relative to each other.

A main helical flight 89 extends around the main auger section 81. The flight 89 is rigidly secured, such as by welding, to the main section 81. Flight 89 is wound in two directions to deliver the severed grain to the center of the main platform 13 (FIG. 1). An extensible helical flight 91 extends around each extensible section 83. The flight 91 on the extensible auger section 83 on the opposite side from the extensible auger section 83 shown in FIG. 4 will be wound in the opposite direction to that shown in FIG. 4. Flight 91 is made up of a plurality of segments. Each segment extends for less than 180 degrees and is connected to the other segment by hinges 93. One end of the flight 91 is connected by a hinge 93 to the main flight 89. The other end of each extensible flight 91 is connected rigidly to an outer end of each extensible section 83.

A plurality of support rings (only two are shown) are slidingly carried by each extensible section 83. The support rings 95 are oval metal rings. Each ring 95 has a hinge pin 97 that connects it to one of the segments of the extensible flight 91. Each support ring 95 has a lug 99 that extends into the guide slot 85. The flight 91 crosses over the support rings 95. There is a clearance between the flight 91 and the extensible auger section 83 that accommodate the support rings 95

Figure 5:
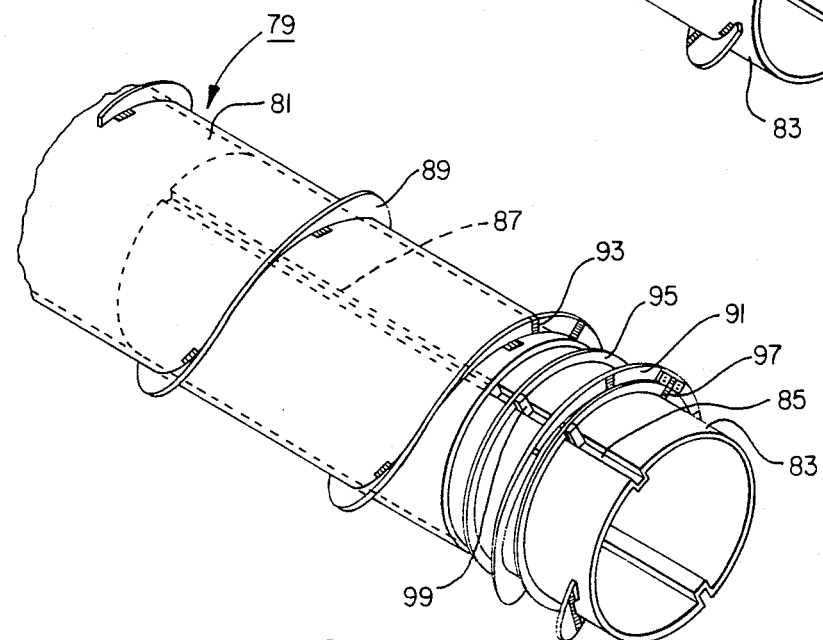
FIG. 5 is a perspective view of the auger of FIG. 4, showing the auger in a retracted position.

The support rings 95 will slide on the extensible section 83 as it moves from the extended position shown in FIG. 4 to the retracted position shown in FIG. 5. Also, when in the extended position, the support rings 95 will tilt relative to a radial plane of the axis of the auger 79. The tilting, which is due to the oval hole of the support rings 95, wedges the support rings 95 against movement. This supports the flight 91 in a helical shape while pushing product to the center of the main platform 13. The flight 91 also collapses when the extensible auger sections 83 move to the retracted position.

Figure 6:
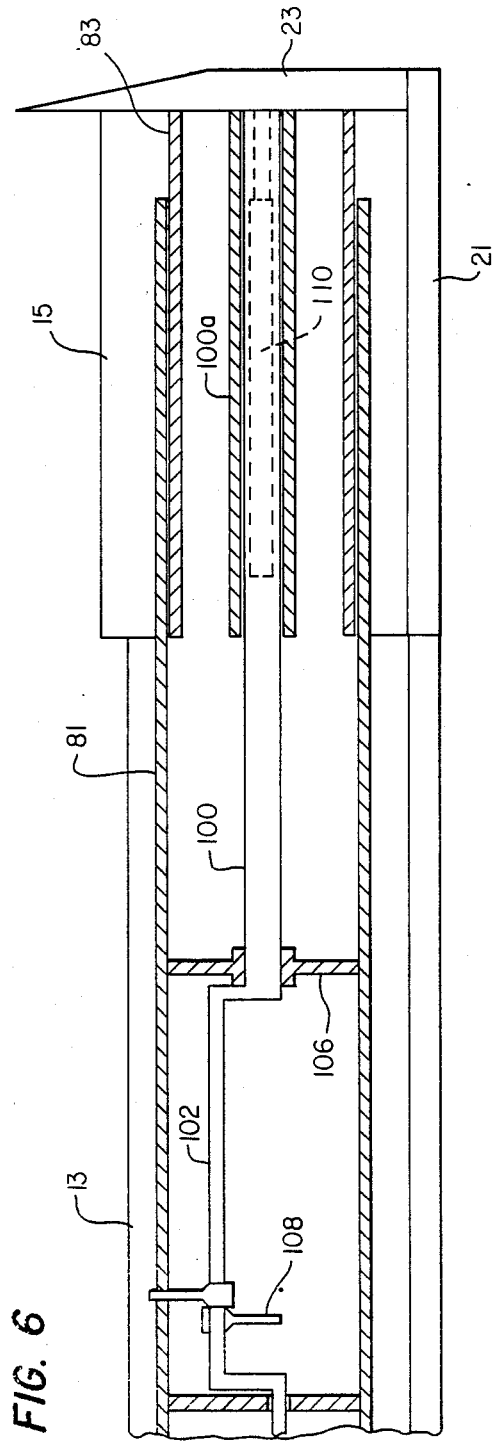
FIG. 6 is a simplified sectional view of the auger of FIG. 4.

Referring to FIG. 6, a square telescoping tube having a main section 100 and extensible sections 100a (only one shown) is mounted between the end plates 23 of the extensible platforms 15, 17. The square tube sections 100, 100a will not rotate with the auger 79. The main tube section 100 has an eccentric section 102 in its center. The eccentric section 02 is parallel to but offset from the sections 100, 100a. The main tube section 100 is supported in the main auger section 81 by bearings located in a circular plate 106. The plate 106 rotates with the main auger section 81.

A plurality of fingers 108 (only two shown) are rigidly mounted to eccentric section 102. The fingers 108 are positioned to protrude through holes in the main auger section 81. Because of the eccentric mounting, as the main auger section 81 rotates, the fingers 108 will be in protruding and recessed positions relative to the main auger section 81. The eccentricity provides an illusion of the fingers 108 moving in and out, but actually they remain stationary. The fingers 108 assist in feeding the grain into the feed opening 25 (FIG. 1). Stationary eccentrically mounted fingers are used on conventional headers.

A hydraulic cylinder 110 located in each tube section 100, 100a on each end serves to keep the main auger section 81 in the center of the main platform 13. The hydraulic cylinders 110 extend and retract when the hydraulic cylinders 27 (FIG. 1) and 75 (FIG. 3) are operated.

Referring to FIG. 9, a reel 101 will be mounted to the header 11. The reel 101 has an axle 103 and an axle 104. The axles 103, 104 are carried concentrically within one another. One end of each axle 103, 104 will be rotatably mounted to one of the arms 105 located on the ends of the extensible sections 15, 17, as shown in FIG. 1. A plurality of spokes 107 extend outward from the axles 103, 104. A plurality of slats 109 are mounted between the spokes 107 and extend the full length of the reel 101. The slats 109, 111 telescope within one another, similar to the axles 103, 105. When the extensible platforms 15, 17 extend and retract, the reel slats 109, 111 also extend and retract. This additional hydraulic power may be needed, to assist in expansion and retraction.

In operation, the combine will in a conventional manner rotate the auger 79. The sickle sections 29, 31 and 33 (FIG. 1) will reciprocate. The reel 101 (FIG. 9) will rotate. Grain will be cut by the sickles 29, 31, 33 (FIG. 1) and pushed inward into the platform sections 13, 15, 17 by the reel 101. The auger 79 (FIG. 4) will advance the grain toward the feed opening 25 (FIG. 1). Fingers 108 (FIG. 6) in the auger 79 assist in pushing the grain through the feed opening 25.

When it is desired to change the width of the header 11, hydraulic power is supplied to the hydraulic cylinders 27 (FIG. 1) and 75 (FIG. 3). If the power supplied is to further extend the extensible platforms 15, 17, then the extensible platforms 15, 17 will begin moving outward. The auxiliary sickles 31, 33 will move outward in unison with the extensible platforms 15, 17 The extensible auger sections 83 (FIG. 4) will move outward along with the movement of the extensible platforms 15, 17. The reel slats 109, 111 will telescope outward (FIG. 9). The header 11 will cut grain in the retracted position, extended position, and any selected positions between these two extreme positions.

FIG. 10 shows an alternate embodiment for driving the auxiliary sickle 33' with the main sickle 29'. The drive link 39' reciprocates the main sickle 29' in the same manner. A rack 113 is mounted to the main sickle 29'. A rack 11 is mounted to the auxiliary sickle 33'. A pinion 117 is located between and engages both racks 113, 115. The pinion 117 is a bevelled gear. A spring (not shown) urges the pinion 117 upward into tight engagement with the bevelled teeth on the racks 113, 115. The spring force reduces looseness in movement between the rotation of the pinion 117 and the racks 113, 115, even as the pinion 117 wears.

The pinion 117 will transmit the reciprocating motion of the main sickle 29' to the auxiliary sickle 33'. The motion of the auxiliary sickle 33' will be out of phase with the motion of the main sickle 29'. The pinion 117 is mounted to a hydraulic cylinder 119 which has a piston rod 121. The piston rod 121 is fixed to the main platform (not shown) by bracket 123. Extending and retracting the hydraulic cylinder 119 will advance and retract the auxiliary sickle 33' relative to the main sickle 29'.

The invention has significant advantages. The header is easily moved between extended and retracted positions. The extending and retracting movement can be accomplished completely from the combine cab. The header will operate in any position between the retracted and extended position. This allows the header to be operated on uneven fields with one side retracted or both.

While the invention has been described in only one of its forms, it should be apparent to those skilled in the art that it is not so limited, but is susceptible to various changes and modifications without departing from the spirit thereof.

I claim:

1. A header for a combine, the header having a longitudinal axis perpendicular to the direction of travel of the combine, the header having a rearward portion adapted to be connected to the combine, the header comprising in combination:

a platform having at least two platform sections;

platform extension means for moving the platform sections parallel to the longitudinal axis between a retracted position and an extended position;

a rotatably driven auger mounted to the platform and having at least two auger sections;

auger extension means for telescoping the auger sections relative to each other between a retracted position and an extended position simultaneously with the movement of the platform extension means;

a sickle having at least two sickle sections;

sickle extension means for moving the sickle sections parallel to the longitudinal axis between a retracted position and an extended position simultaneously with the movement of the platform extension means;

drive means for reciprocating the sickle sections relative to the platform for cutting vegetation;

a rotatably driven reel mounted to the platform forward of the auger and having at least two reel sections;

reel extension means for sliding the reel sections parallel to the longitudinal axis between a retracted position and extended position simultaneously with the movement of the platform extension means; and wherein the auger and reel will rotate and the sickle reciprocate to cut vegetation in any position including and between the extended and retracted positions.

2. A header for a combine, the header having a longitudinal axis perpendicular to the direction of travel of the combine, the header having a rearward portion adapted to be connected to the combine, the header comprising in combination:

a platform having a main platform section and at least one extensible platform section;

platform extension means for sliding the extensible platform section relative to the main platform section between a retracted position and an extended position;

a rotatably driven auger mounted to the platform and having at least two auger sections;

auger extension means for telescoping the auger sections relative to each other between a retracted position and an extended position simultaneously with the movement of the platform extension means;

a sickle having at least two sickle sections, one of the sickle sections being carried on the main platform section and the other being carried on the extensible platform section;

sickle extension means for sliding the sickle sections relative to each other between a retracted position and an extended position simultaneously with the movement of the platform extension means, each of the sickle sections having a plurality of cutting blades which are contained in the same plane, the cutting blades of one of the sickle sections being located in the same plane with the cutting blades of the other of the sickle sections in both the retracted and extended positions, the cutting blades of one of the sickle sections located more forwardly on the platform than the cutting blades of the other of the sickle sections while in the extended position, a portion of the cutting blades of one of the sickle sections being recessed rearward of and in the same plane with the cutting blades of the other sickle section while the sickle sections are in the retracted position;

drive means for reciprocating the sickle sections relative to the platform for cutting vegetation;

a rotatably driven reel mounted to the platform forward of the auger and having at least two reel sections; and reel extension means for sliding the reel sections relative to each other between a retracted position and extended position simultaneously with the movement of the platform extension means.

3. A header for a combine, the header having a longitudinal axis perpendicular to the direction of travel of the combine, the header having a rearward portion adapted to be connected to the combine, the header comprising in combination:

a platform having a main platform section and at least one extensible platform section;

platform extension means for sliding the extensible platform section relative to the main platform section between a retracted position and an extended position;

a rotatably driven auger mounted to the platform and having at least two auger sections;

auger extension means for telescoping the auger sections relative to each other between a retracted position and an extended position simultaneously with the movement of the platform extension means;

a sickle having at least two sickle sections, one of the sickle sections being carried on the main platform section and the other being carried on the extensible platform section, one of the sickle sections being parallel to but offset rearward from the other sickle section;

sickle extension means for sliding the sickle sections relative to each other between a retracted position and an extended position simultaneously with the movement of the platform extension means, a portion of one of the sickle sections being recessed rearward of the other while the sickle sections are in the retracted position;

drive means for reciprocating the sickle sections relative to the platform for cutting vegetation;

a rotatably driven reel mounted to the platform forward of the auger and having at least two reel sections;

reel extension means for sliding the reel sections relative to each other between a retracted position and extended position simultaneously with the movement of the platform extension means; and wherein the drive means reciprocates the sickle sections in any position including and between the extended and retracted positions.

4. A header for a combine, the header having a longitudinal axis perpendicular to the direction of travel of the combine, the header having a rearward portion adapted to be connected to the combine, the header comprising in combination;

a platform having a main platform section and at least one extensible platform section;

platform extension means for sliding the extensible platform section relative to the main platform section between a retracted position and an extended position;

a rotatably driven auger mounted to the platform and having at least two auger sections;

auger extension means for telescoping the auger sections relative to each other between a retracted position and an extended position simultaneously with the movement of the platform extension means;

a sickle having at least two sickle sections, one of the sickle sections being carried on the main platform section and the other being carried on the extensible platform section, one of the sickle sections being parallel to but offset rearward from the other sickle section;

sickle extension means for sliding the sickle sections relative to each other between a retracted position and an extended position simultaneously with the movement of the platform extension means, a portion of one of the sickle sections being recessed rearward of the other while the sickle sections are in the retracted position;

drive means for reciprocating the sickle sections relative to the platform for cutting vegetation;

a rotatably driven reel mounted to the platform forward of the auger and having at least two reel sections;

reel extension means for sliding the reel sections relative to each other between a retracted position and extended position simultaneously with the movement of the platform extension means; and wherein the drive means reciprocates the sickle sections in any position including and between the extended and retracted positions.

5. A header for a combine, the header having a longitudinal axis perpendicular to the direction of travel of the combine, the header having a rearward portion adapted to be connected to the combine, the header comprising in combination:

a platform having a main platform section and at least one extensible platform section;

platform extension means for sliding the extensible platform section relative to the main platform section between a retracted position and an extended position;

a rotatably driven auger mounted to the platform and having at least two auger sections;

auger extension means for telescoping the auger sections relative to each other between a retracted position and an extended position simultaneously with the movement of the platform extension means;

a sickle having at least two sickle sections, one of the sickle sections being carried on the main platform section and the other being carried on the extensible platform section, one of the sickle sections being parallel to but offset rearward from the other sickle section;

sickle extension means for sliding the sickle sections relative to each other between a retracted position and an extended position simultaneously with the movement of the platform extension means, a portion of one of the sickle sections being recessed rearward of the other while the sickle sections are in the retracted position;

drive means for reciprocating the sickle sections relative to the platform for cutting vegetation;

a rotatably driven reel mounted to the platform forward of the auger and having at least two reel sections;

reel extension means for sliding the reel sections relative to each other between a retracted position and extended position simultaneously with the movement of the platform extension means;

wherein the drive means reciprocates the sickle sections in any position including and between the extended and retracted positions; and wherein the drive means comprises:

a main drive means connected with one of the sickle sections for reciprocating said one of the sickle sections; and drive linkage means connected between the sickle sections for causing the other of the sickle sections to reciprocate in opposite directions to said one of the sickle sections.

6. A header for a combine, the header having a longitudinal axis perpendicular to the direction of travel of the combine, the header having a rearward portion adapted to be connected to the combine, the header comprising in combination:

a platform having a main platform section and at least one extensible platform section;

platform extension means for sliding the extensible platform section relative to the main platform section between a retracted position and an extended position;

a main sickle section carried on the main platform;

an auxiliary sickle section carried on the extensible platform;

one of the sickle sections being parallel to but offset rearward from the other sickle section;

drive means carried by the main platform section for reciprocating the main sickle section to cut vegetation;

a pair of guide wheels carried by the platform;

a linking member extending around the guide wheels, defining a forward run extending between the guide wheels and a rearward run extending between the guide wheels;

one of the sickle sections being connected to the forward run and the other of the sickle sections being connected to the rearward run, so that reciprocating movement by the drive means of the main sickle section causes the linking member to reciprocate about the guide wheels and reciprocate the auxiliary sickle section; and sickle extension means for moving the auxiliary sickle section relative to the main sickle section between a retracted position and an extended position simultaneously with the movement of the platform extension means, a portion of one of the sickle sections being recessed rearward of the other while the sickle sections are in the retracted position.

7. The header according to claim 6 wherein the linking member comprises a cable.

8. The header according to claim 6 wherein the sickle extension means comprises means for moving the guide wheels parallel to the longitudinal axis relative to the main sickle section.

9. The header according to claim 6 wherein the sickle extension means comprises:

a slide plate, which is slidably carried on the extensible platform section, the guide wheels being mounted to the slide plate for movement therewith parallel to the longitudinal axis;

a slide plate rack mounted to the slide plate;

a fixed rack stationarily mounted to the main platform section;

a pinion rotatably carried by the extensible platform section and movable with the extensible platform section parallel to the longitudinal axis, whereby movement of the extensible platform section parallel to the longitudinal axis rotates the pinion, causing the slide plate to move relative to the main platform section parallel to the longitudinal axis and slide on the extensible platform section, rotating the guide wheels and moving the auxiliary sickle parallel to the longitudinal axis.

10. The header according to claim 9 wherein from the retracted position to the extended position, the slide plate will move relative to the main platform a distance substantially equal to the length of one of the runs.

11. The header according to claim 10 wherein from the retracted position to the extended position, the auxiliary sickle will move a distance substantially equal to the combined lengths of the runs.

12. The header according to claim 9 wherein the point at which the main sickle attaches to the linking member remains stationary relative to the main platform while the sickle extension means moves the auxiliary sickle between the retracted and extended positions.

13. A header for a combine, the header having a longitudinal axis perpendicular to the direction of travel of the combine, the header having a rearward portion adapted to be connected to the combine, the header comprising in combination:
- a platform having a main platform section and an extensible platform section on each side of the main platform section;
- platform extension means for sliding the extensible platform sections relative to the main platform section between a retracted position and an extended position;
- a main sickle section carried on the main platform;
- an auxiliary sickle section carried on each extensible platform, each auxiliary sickle section being parallel to but offset forward from the main sickle section;
- drive means carried by the main platform section for reciprocating the main sickle section to cut vegetation;
- a pair of slide plates, one of which is slidably carried on each extensible platform section;
- a pair of guide wheels mounted rotatably to each slide plate;
- a linking member extending around each set of the guide wheels, defining a forward run extending between the guide wheels and a rearward run extending between the guide wheels;
- each auxiliary sickle section being connected to the forward run of one of the linking members, the main sickle section being connected to the rearward run of both of the linking members, so that reciprocating movement by the drive means of the main sickle section causes the linking members to reciprocate about the guide wheels and reciprocate the auxiliary sickle sections;
- a slide plate rack mounted to each slide plate;
- a fixed rack stationarily mounted to the main platform section;
- a pinion rotatably carried by each extensible platform section for movement therewith parallel to the longitudinal axis, whereby movement of each extensible platform section parallel to the longitudinal axis rotates each pinion, causing each slide plate to move relative to the main platform section parallel to the longitudinal axis and slide on each extensible platform section, rotating the guide wheels on each slide plate and moving the auxiliary sickles parallel to the longitudinal axis.

14. A header for a combine, the header having a longitudinal axis perpendicular to the direction of travel of the combine, the header having a rearward portion adapted to be connected to the combine, the header comprising in combination:
- a platform having a main platform section and at least one extensible platform section;
- platform extension means for sliding the extensible platform section relative to the main platform section between a retracted position and an extended position;
- a main sickle section carried on the main platform;
- an auxiliary sickle section carried on the extensible platform;
- one of the sickle sections being parallel to but offset rearward from the other sickle section;
- drive means carried by the main platform section for reciprocating the main sickle section to cut vegetation;
- a rack mounted to the main sickle section;
- a rack mounted to the auxiliary sickle section;
- a pinion mounted between and in engagement with the racks, whereby reciprocating movement of the main sickle section by the drive means rotates the pinion back and forth to reciprocate the auxiliary sickle section; and
- sickle extension means for moving the pinion relative to the main sickle section between a retracted position and an extended position simultaneously with the movement of the platform extension means to extend and retract the auxiliary sickle section.

15. The apparatus according to claim 14 wherein the sickle extension means comprises a hydraulic piston and cylinder connected between the extensible platform and the main platform for moving the pinion as the platform extension means slides the extensible platform.

16. In a header for a combine having a main platform and an extensible platform that moves between retracted and extended positions, an improved extensible auger, comprising in combination:
- a main cylinder
- a main helical flight rigidly secured to the main cylinder;
- an extensible cylinder that telescopes within the main cylinder as the extensible platform moves between the retracted and extended positions, the extensible cylinder having an outer end that rotatably mounts to one side of the platform;
- an extensible helical flight carried on the extensible cylinder, the extensible flight having an outer end stationarily mounted to the extensible cylinder adjacent to the outer end of the extensible cylinder and an inner end stationarily connected to the main helical flight, the portions of the extensible helical flight section between the inner and outer ends being free to move relative to extensible cylinder to allow the extensible helical flight section to retract and extend as the extensible cylinder retracts and extends; and
- the extensible helical flight being formed of a plurality of separate segments connected together by hinges to facilitate the retraction and extension of the extensible helical flight.

17. The header according to claim 16 further comprising;
- means for preventing rotation between the main cylinder and the extensible cylinder while moving between the retracted and extended positions.

18. In a header for a combine having a main platform and an extensible platform that moves between retracted and extended positions, an improved extensible auger, comprising in combination:

a main cylinder;

a main helical flight rigidly secured to the main cylinder;

an extensible cylinder that telescopes within the main cylinder as the extensible platform moves between the retracted and extended positions, the extensible cylinder having an outer end that rotatably mounts to a side of the platform;

a guide extending longitudinally on the extensible cylinder;

guide means on the main cylinder for engaging the guide to prevent relative rotation between the cylinders;

a plurality of rings slidingly carried on the extensible cylinder, each ring having a guide member that engages the guide;

an extensible helical flight carried on the extensible cylinder, the extensible flight having an outer end stationarily mounted to the extensible cylinder adjacent to the outer end of the extensible cylinder and an inner end stationarily connected to the main helical flight, the extensible helical flight being formed of a plurality of separate segments connected together by hinges;

the segments having an inner dimension sufficient to allow the extensible helical flight to extend over the rings;

each of the rings being pivotally connected to one of the segments to provide support for the extensible helical flight during harvesting of vegetation.

19. The header according to claim 18 wherein the guide is a slot and the guide member is a tab extending radially inward from the ring.

* * * * *